(12) United States Patent
Sharpe (10) Patent No.: US 12,351,315 B2
(45) Date of Patent: Jul. 8, 2025

(54) TWO-STAGE ENERGY ABSORBING SYSTEM FOR ROTARY-WING AIRCRAFT SEATS

(71) Applicant: AMI Industries, Inc., Colorado Springs, CO (US)

(72) Inventor: Jason M. Sharpe, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 254 days.

(21) Appl. No.: 17/986,507

(22) Filed: Nov. 14, 2022

(65) Prior Publication Data
US 2024/0158085 A1      May 16, 2024

(51) Int. Cl.
*B64D 11/06*      (2006.01)
(52) U.S. Cl.
CPC .................. *B64D 11/0619* (2014.12)
(58) Field of Classification Search
CPC ....................... B64D 11/0619; B60N 2/427
See application file for complete search history.

(56) References Cited

U.S. PATENT DOCUMENTS

| | | | |
|---|---|---|---|
| 4,204,659 A | 5/1980 | Phillips et al. | |
| 6,123,388 A * | 9/2000 | Vits | B60N 2/688 297/483 |
| 8,678,465 B1 * | 3/2014 | Aragon | B60N 2/0722 296/68.1 |
| 9,327,623 B2 * | 5/2016 | Olivares | B60N 2/24 |
| 9,969,307 B1 * | 5/2018 | Bosen | B64D 11/0619 |
| 10,166,889 B1 | 1/2019 | Lou et al. | |
| 10,537,149 B2 | 1/2020 | Cormier et al. | |
| 2008/0211275 A1 | 9/2008 | Lamparter et al. | |
| 2010/0230988 A1 | 9/2010 | Cantor et al. | |
| 2010/0270836 A1 | 10/2010 | Mowry et al. | |
| 2011/0204685 A1 | 8/2011 | Dock | |
| 2021/0024203 A1 | 1/2021 | Chappell et al. | |

FOREIGN PATENT DOCUMENTS

| | | | | |
|---|---|---|---|---|
| CN | 115257482 A | 11/2022 | | |
| EP | 3159208 A1 * | 4/2017 | ............ | B21D 53/92 |
| WO | WO-2016126200 A1 * | 8/2016 | ......... | B60N 2/01508 |

OTHER PUBLICATIONS

European Search Report dated Mar. 15, 2024; European Application No. 23208658.

* cited by examiner

*Primary Examiner* — Timothy J Brindley
(74) *Attorney, Agent, or Firm* — Suiter Swantz IP (57) ABSTRACT

A seat and an energy absorbing system for a seat including sequentially activated first and second energy absorbing devices. The first device is resiliently deformable and activates to accommodate less severe dynamic events whereas the second device plastically deforms to accommodate severe dynamic events such as a crash. In use, when a first predetermined load value is exceeded the first device activates until a compressive limit of the first device is reached, after which exceeding a second predetermined load value transfers remaining energy to the second device. In embodiments, the first device operates to permit a limited amount of seat bucket stroking followed by recovery to an original state, and the second device operates to permit continued stroking without recovery to an original state.

13 Claims, 8 Drawing Sheets

TWO-STAGE ENERGY ABSORBING SYSTEM FOR ROTARY-WING AIRCRAFT SEATS

TECHNICAL FIELD AND BACKGROUND

The present disclosure relates generally to energy absorbing systems for rotary-wing aircraft seats, and more particularly to a two-stage energy absorbing system including first and second energy absorbing devices configured to activate sequentially responsive to dynamic events exceeding predetermined threshold load values.

Seats such as pilot and copilot seats in rotary-wing aircraft such as helicopters are required to stroke downward to protect the occupant's spine during a severe dynamic event such as a crash. Stroking motion typically occurs between a seat bucket and a seat base. In use, when a predetermined threshold load value is exceeded, the seat bucket strokes downward relative to the seat base along a generally vertical motion path.

Such seats are typically equipped with a device coupled between the seat bucket and the seat base configured to maintain a component positional relationship and absorb energy as the seat bucket strokes. In use, the energy absorbing device is configured to activate when a predetermined load value on the seat bucket is exceeded to release a fixed connection between the seat bucket and the seat base, thereby allowing the seat bucket to stroke downward.

As the seat bucket strokes downward, the energy absorbing device undergoes a deformation, typically plastic deformation, to absorb a portion of the energy and transfer the same to the seat base. The plastic deformation destroys the integrity of the energy absorbing device requiring replacement of the device following the deformation.

During less severe repetitive events insufficient to trigger device activation, for example hard landings, severe turbulence, and high wind gust loading, the energy absorbing device remains intact to prevent relative movement between the seat bucket and the seat base. As such, the energy absorbing device does not function to absorb energy from less severe events that do not exceed spinal loads but may still cause discomfort to the passenger.

Accordingly, it would be desirable to equip the seat with separate energy absorbing devices, wherein one device is configured to accommodate severe dynamic events while an additional device is configured to accommodate less severe events in order to increase occupant comfort, reduce fatigue, and reduce repetitive impact related injuries.

BRIEF SUMMARY

In one aspect, the present disclosure provides a seat including a seat base, a seat bucket movable relative to the seat base, a motion controller coupled between the seat bucket and the seat base configured to control a motion path of the seat bucket, a first energy absorbing device associated with the motion controller and including an elastomeric element, and a second energy absorbing device associated with the motion controller and including a deformable element. In use, when a first predetermined load value on the seat bucket is exceeded, the elastomeric element is configured to undergo resilient deformation to allow the seat bucket to stroke relative to the seat base, and when a second predetermined load value on the seat bucket is exceeded, greater than the first predetermined load value, the deformable element is configured to undergo plastic deformation to allow the seat bucket to continue stroking relative to the seat base. In embodiments, the first and second energy absorbing devices are separate devices and are configured to activate sequentially such that the first energy absorbing device is configured to absorb first energy from a dynamic event and transfer remaining energy from the dynamic event to the second energy absorbing device.

In some embodiments, the motion controller includes a carrier assembly coupled to the seat base, and a carriage assembly coupled to the seat bucket and movably coupled to the carrier assembly, wherein the first energy absorbing device is configured to activate to allow movement between the motion controller and the seat base or the seat bucket, and the second energy absorbing device is configured to activate to allow movement between the carriage assembly and the carrier assembly.

In some embodiments, the motion controller includes a carrier assembly coupled to the seat base, and a carriage assembly coupled to the seat bucket and movably coupled to the carrier assembly, wherein the first energy absorbing device is configured to activate to allow movement of the carriage assembly relative to the carrier assembly, and the second energy absorbing device is configured to activate to allow continued movement of the carriage assembly relative to the carrier assembly.

In some embodiments, the seat base includes guideways and each of the carriage assembly and the carrier assembly include guides configured to travel along the guideways as the motion controller strokes relative to the seat base and/or the carriage assembly strokes relative to the carrier assembly.

In some embodiments, the first energy absorbing device includes a guide member defining an elongated guideway, wherein the elastomeric element is positioned in the guideway, and a guide positioned in the elongated guideway in contact with the elastomeric element. In use, when the first predetermined load value is exceeded, the guide travels along the elongated guideway thereby compressing the elastomeric element.

In some embodiments, the elastomeric element is a natural polymer, a synthetic polymer, a metallic spring, or combinations thereof.

In some embodiments, the deformable element is a singular sheet having an introduced fold, and wherein the sheet is 304 stainless steel sheet and is not heat treated.

In some embodiments, the deformable element is a wire associated with a wire bender system including a plurality of rollers, wherein the wire is threaded through the plurality of rollers such that the wire is configured to be bent and unbent as the wire is pulled through the plurality of rollers.

In some embodiments, the first energy absorbing device is accessible through an opening formed in a back of the seat and the second energy absorbing device is positioned within the seat.

According to another aspect, the present disclosure provides an energy absorbing system including a first energy absorbing device associated with a seat element and including an elastomeric element, and a second energy absorbing device associated with the seat element and including a deformable element. When a first predetermined load value on the seat element is exceeded, the elastomeric element is configured to undergo resilient deformation to allow the seat element to move. When a second predetermined load value on the seat element is exceeded, greater than the first predetermined load value, the deformable element is configured to undergo plastic deformation to allow the seat element to continue moving. The first and second energy absorbing devices are separate devices and are configured to activate sequentially such that the first energy absorbing device is configured to absorb first energy from a dynamic event and transfer remaining energy from the dynamic event to the second energy absorbing device.

In some embodiments, the seat element is a motion controller configured to movably couple a seat bucket to a seat base.

In some embodiments, the motion controller includes a carrier assembly and a carriage assembly, wherein the first energy absorbing device is associated with a coupled state of the carrier assembly and the carriage assembly, and the second energy absorbing device is associated with a decoupled state of the carrier assembly and the carriage assembly.

This brief summary is provided solely as an introduction to subject matter that is fully described in the detailed description and drawings. This brief summary should not be considered to describe essential features nor be used to determine the scope of the claims. Moreover, it is to be understood that both the foregoing brief summary and the following detailed description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Broadly, the present disclosure provides a configuration of a seat such as a pilot seat or copilot seat for a rotorcraft such as a helicopter. The seat generally includes a seat base and a seat bucket movably coupled to the seat base. The seat bucket may be centered relative to the seat base or offset relative to the seat base. A portion of the seat bucket may overhang the seat frame in one lateral direction. The seat bucket is movably coupled to the seat base by a motion controller such as a singular motion controller centered relative to the seat bucket and relative to the seat occupant. The singular motion controller may not be centered relative to the seat base. In other words, the singular motion controller may be laterally shifted to one side of the seat frame in order to be centered relative to the offset seat bucket. The seat may include symmetrical component relationships as well as asymmetrical component relationships.

Figure 1:
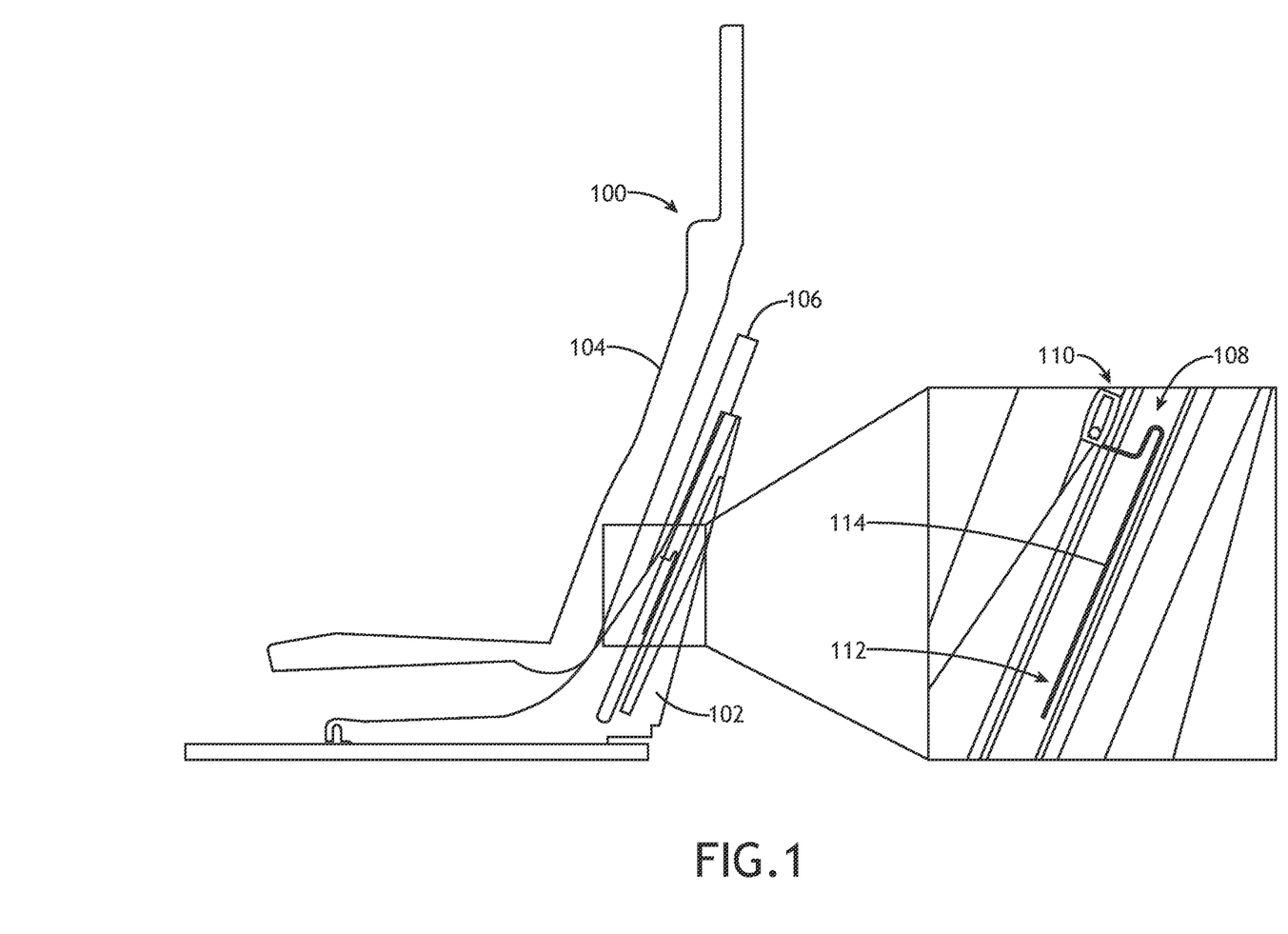
FIG. 1 shows a non-limiting example of a pilot seat schematically illustrating a two-stage energy absorbing system in accordance with an embodiment of this disclosure.

FIG. 1 illustrates a non-limiting example of a seat 100 such as a pilot seat for a rotary-wing aircraft such as a helicopter. Some rotary-wing aircraft include a cockpit configured with a pilot seat and a copilot seat positioned on opposite lateral sides of a well providing stowage space for retractable landing gear which impacts the position of the floor tracks for attaching the seats. In some embodiments, the well requires the floor tracks to be moved laterally outward as compared to a cockpit configuration without a well. The seat 100 generally includes a seat base 102 carrying track fasteners required to be positioned directly above the respective floor tracks. Considering the cockpit dimensions and flight control positions, the seat bucket 104 coupled to the seat base may be required to be positioned laterally offset (e.g., inward) relative to the seat base 102 and the well. This outward seat base position and inward seat bucket position may result in an offset pilot seat in which the seat bucket 104 is not centered relative to its respective seat base 102. In other embodiments, the seat bucket 104 may be centered relative to its respective seat base 102.

The seat bucket 104 is movably coupled to the seat base, either directly or indirectly. In some embodiments, the seat base 102 is configured to move longitudinally along the floor tracks to position the seat relative to the flight controls. In some embodiments, the seat base 102 is capable of longitudinal adjustment and incapable of lateral adjustment. In some embodiments, the seat bucket 104 is vertically adjustable relative to the seat base 102.

The seat base 102 may include spaced frame members 106 interconnected by transverse frame members. For example, the seat base 102 may include first and second frame members positioned at the lateral sides of the seat base. At least one additional frame member 106 may be positioned between and in spaced apart relation to each of the first and second frame members in the case of an offset seat. In some embodiments, the frame members 106 are oriented generally vertical and are parallel. In some embodiments, the frame members 106 are inclined to provide a comfortable ergonomic sitting position.

The seat base 102 may further include a transverse frame member, oriented substantially horizontal, extending substantially the width of the seat base and coupled to each of the frame members 106. In the case of an offset seat base 102 including three frame members 106, a first transverse member may be coupled between the outboard and middle frame members and a second transverse member may coupled between the middle and inboard frame members. The inboard frame member may be positioned closest to the cockpit centerline while the outboard frame member may be positioned closest to the fuselage.

With continued reference to FIG. 1, the seat 100 is further equipped with a two-stage energy absorbing system 108 according to the present disclosure and generally including a first device 110 and a second device 112. The first and second devices 110, 112 may be separate devices wherein each device serves a particular function. As discussed in detail below, the first device 110 is a repeated-use device configured to accommodate less severe dynamic events to generally improve occupant comfort, whereas the second device 112 is a one-time use device configured to accommodate severe dynamic events to protect the occupant's spine. In use, the repeated-use device is configured to reset automatically for additional uses after each activation, whereas the one-time use device undergoes plastic deformation requiring replacement after a single use. In use, the devices work together in sequence such that the first device 110 is activated to absorb energy until a limit of the first device is reached, thereafter the second device 112 activates to continue absorbing energy. For example, the one-time use device is shown implemented as a single sheet 114 made from stainless steel and having an introduced fold for imparting further folding to absorb energy.

Figure 2:
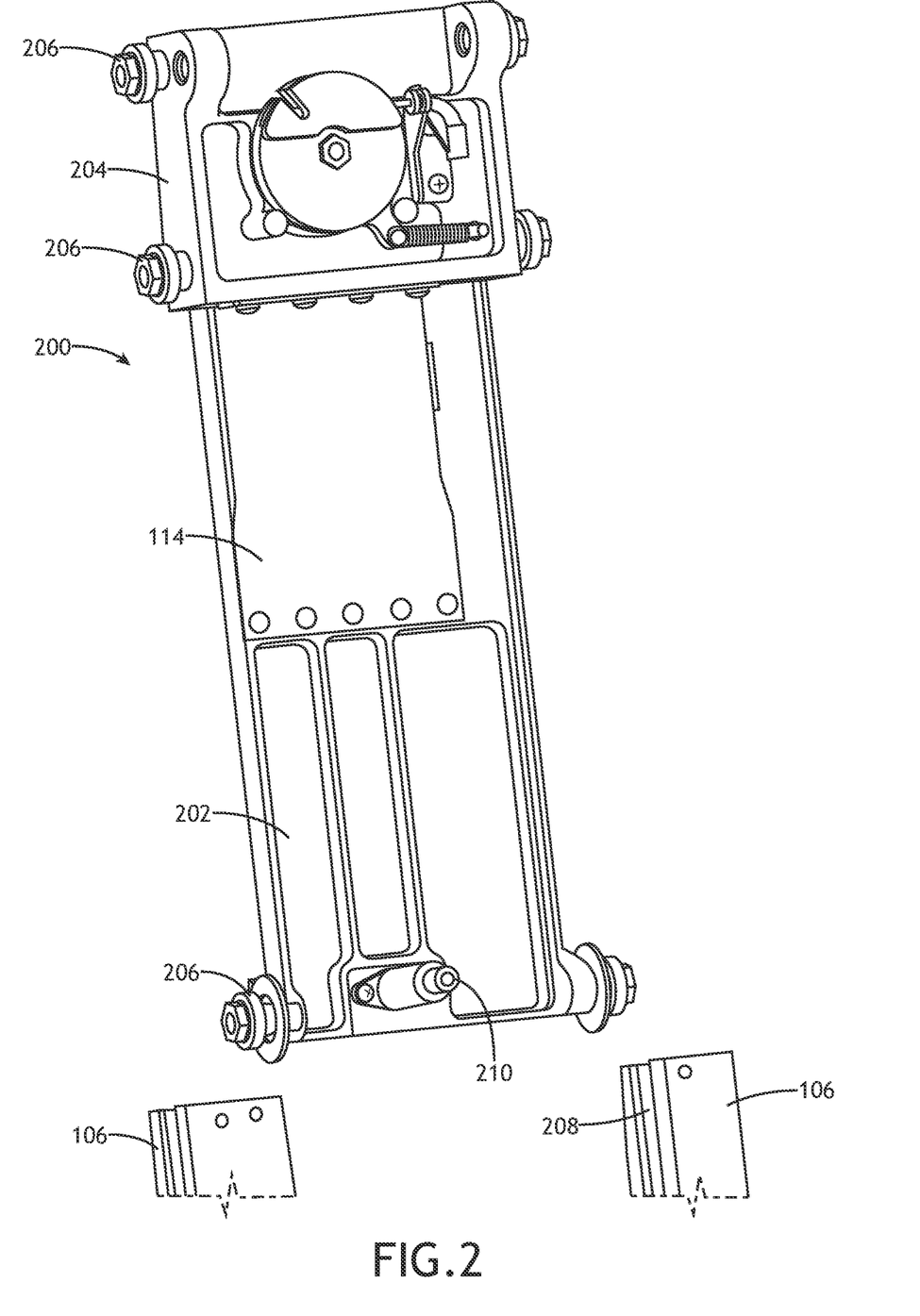
FIG. 2 is a front isometric view of a non-limiting example of a seat bucket motion controller in accordance with an embodiment of this disclosure.

FIG. 2 shows a non-limiting example of a seat bucket motion controller 200 for being positioned between and movably supported by the spaced frame members. In use, the motion controller 200 is a singular mechanism operable to change the seat bucket position relative to the seat base and further act in a specific manner during dynamic events as discussed below. The motion controller 200 generally includes a carrier assembly 202 attachable to the seat base and a carriage assembly 204 coupled to the carrier assembly through the second device implemented as the sheet 114. The motion controller 200 may be positioned substantially centered relative to the seat bucket and therefore also substantially centered relative to the occupant. In some embodiments, the motion controller 200 may be nearly centered relative to a centerline of the seat bucket such that the one-time use energy absorber is also centered relative to the centerline such that the sheet 114 is evenly and uniformly loaded.

The seat base (102 in FIG. 1) may include guideways 208 formed or otherwise provided in the vertical frame members 106. In some embodiments, the guideways 208 are implemented as roller channels formed on their inboard side and configured to receive and define a motion path of the motion controller 200. In some embodiments, the motion path is linear. In some embodiments, the motion path includes combined linear and rotational motion, occurring simultaneously or sequentially. The motion controller 200 generally includes the carrier assembly 202 and the carriage assembly 204 coupled through at least a portion of the energy absorbing system. Each of the carrier assembly 202 and the carriage assembly 204 carries vertically oriented rollers 206 configured to engage in and roll along the roller channels. In some embodiments, the carrier assembly 202 includes a pair of laterally opposed rollers and the carriage assembly includes multiple pairs of laterally opposed rollers. The rollers 206 function to facilitate smooth movement of the assemblies relative to the seat base.

The motion controller 200 may further include a seat bucket height adjustment mechanism that interacts between the carrier assembly 202 and the seat base. In some embodiments, a transverse spreader may include a plurality of spaced apart and vertically aligned metering holes and the carrier assembly 202 may include a spring-loaded pin 210. In use, the spring-loaded pin 210, which may be actuated via a translating Bowden cable or like mechanism, is received in one of the metered openings at a time to lock the vertical position of the seat bucket relative to the seat base. To change the vertical seat position, the pin is pulled to withdraw the pin from one of the metered openings, the seat bucket is moved to a different vertical position, and the pin is released and settles into the aligned opening to lock the seat bucket height.

Figure 3:
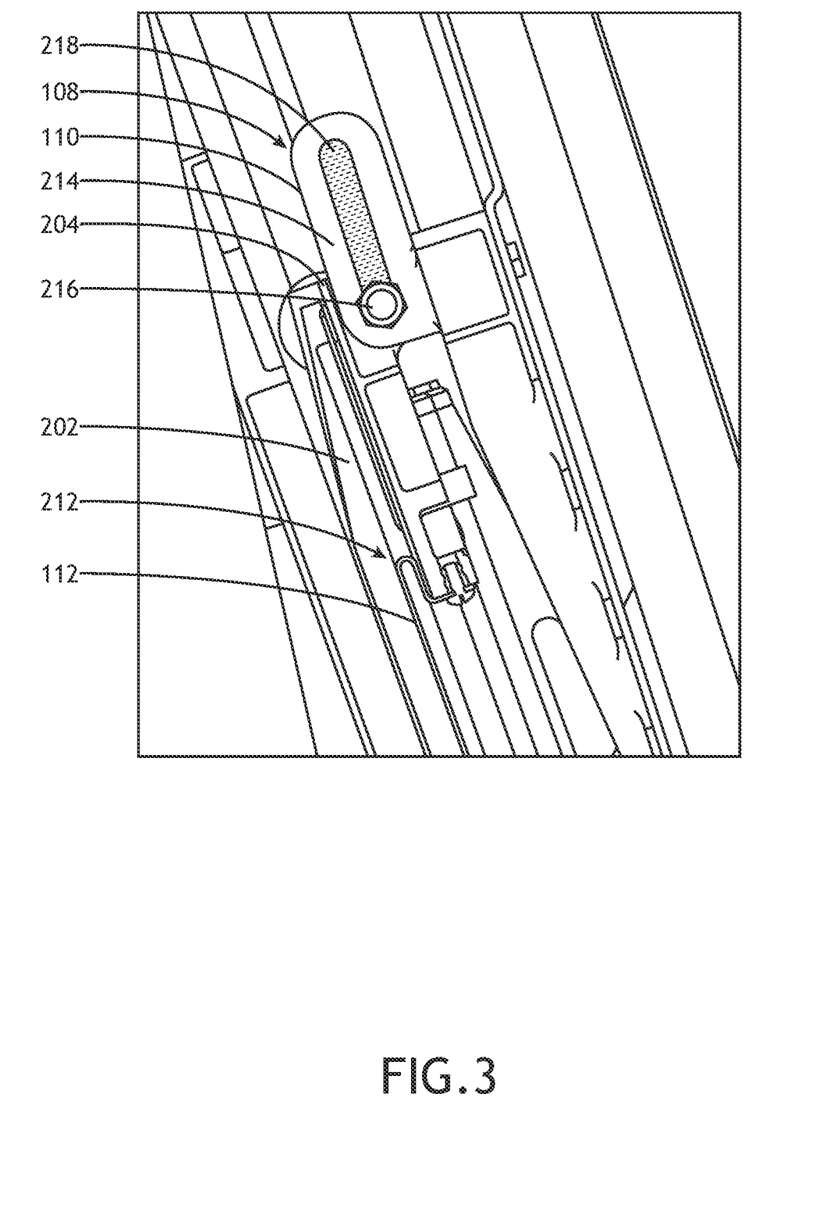
FIG. 3 is a detailed view of a portion of the pilot seat of FIG. 1 illustrating first and second separate energy absorbing devices associated with the seat bucket motion controller of FIG. 2.
Figure 4:
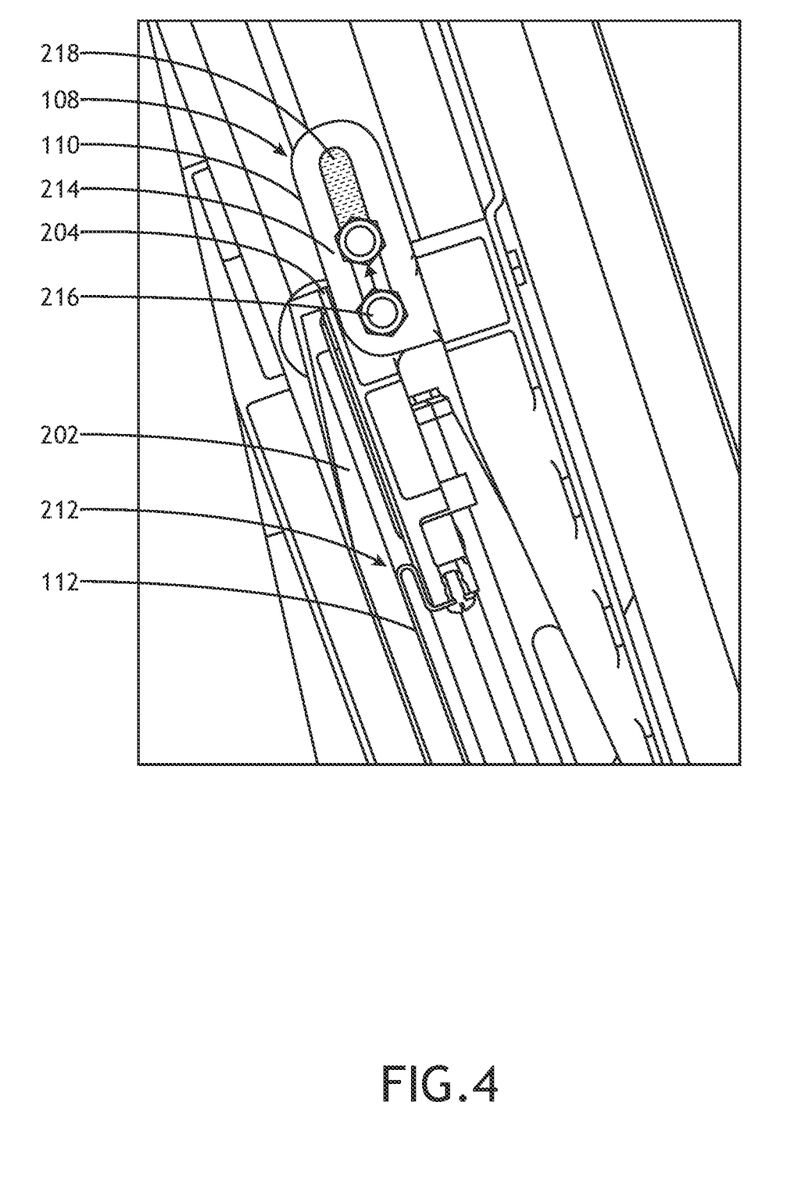
FIG. 4 shows the first or repeated-use energy absorbing device resiliently deformed and the one-time use energy absorbing device intact.
Figure 5:
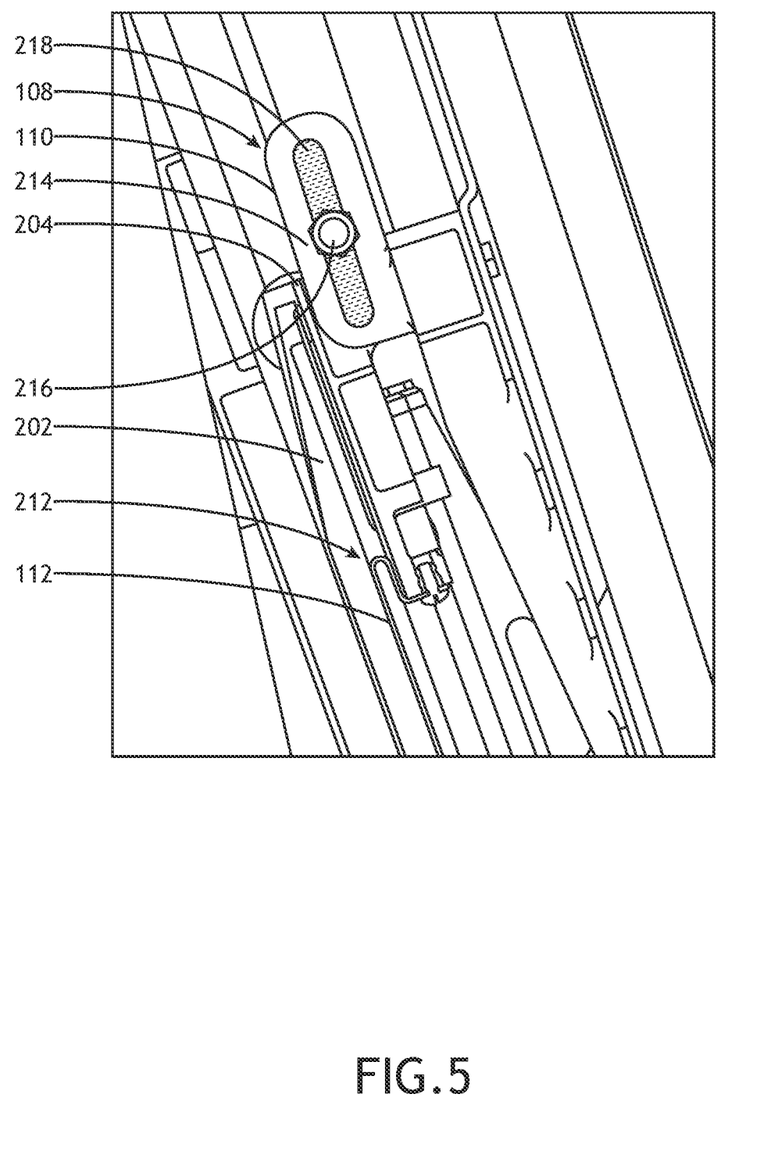
FIG. 5 shows another embodiment of the repeated-use energy absorbing device configured to accommodate seat bucket stroking in two directions.

FIGS. 3-5 illustrate the two-stage energy absorbing system 108 according to a first embodiment of the present disclosure. The system 108 generally includes the separate first and second devices 110, 112. As discussed above, the first device 110 is a repeated-use device configured to activate responsive to less severe events and reset automatically after each event in preparation for a next qualifying event. The first device 110 is tunable to act responsive to a predetermined load value. For example, when a predetermined threshold load value is exceeded, the first device 110 acts to allow the carrier and carriage assemblies 202, 204 to stroke in a coupled or decoupled state relative to the seat base. The second device 112 is shown implemented as a sheet having an introduced fold 212. The folded portion is constrained between the carrier and carriage assemblies such that the fold is caused to continue downward as the sheet continues to fold over itself as the carriage assembly 204 strokes downward relative to the carrier assembly 202. The second device 112 is a one-time use device that undergoes plastic deformation requiring replacement after use.

In embodiments, the two energy absorbing devices 110, 112 are separate devices packaged and located positioned apart within the seat. In some embodiments, the first, repeated-use device 110 includes a guideway member 214 coupled to the seat base or to one of the carrier or carriage assemblies, and a guide 216 coupled to the other of the seat base or to the carrier or carriage assembly. The guideway member 214 forms an elongated guideway along which the guide 216 travels during stroking. An elastic member 218 disposed in the elongated guideway contacts the guide 216, which may be implemented as a pin or the like. The elastic member 218 functions to compress thereby allowing controlled movement of the guide 216 along the guideway member 214, or vice versa, thereby allowing a limited amount of travel of the seat bucket to improve comfort for the occupant.

With reference to FIG. 3, in the absence of a less severe event causing seat bucket movement, i.e., load values below a first predetermined threshold load value (e.g., normal turbulence, normal wind gust loads, etc.) the first and second devices 110, 112 remain inactive. During a less severe event exceeding a first predetermined threshold load value, the elastic force of the elastic member 218 is overcome by contact with the guide 216 allowing a limited amount of downward stroking of the seat bucket relative to the seat base to improve comfort for the occupant. Assuming the load value remains below a second predetermined threshold load value, when the event subsides the elastic memory of the elastic member 218 returns the first device to a reset position automatically in preparation for a next less severe event. Thus, the elastic memory of the elastic member 218 allows for repeated uses. FIG. 4 shows the elastic member 218 compressed by interaction with the guide 216 thereby allowing a limited amount of downward stroking of the seat bucket relative to the seat frame.

FIG. 5 shows another version of the first device 110 in which two elastic members 218 are provided in the formed guideway, with one member positioned above the guide and the other member positioned below the guide. Thus, the guide 216 is positioned between the two members in a ready state of the first device 110. Alternatively, the elastic member 218 may be a single device having a central opening receiving the guide 216. In use, the two elastic members or central position allows the seat bucket to stroke up or down depending on the event and the elastic member(s) 218 function to absorb a portion of that energy.

In embodiments, the elastic member 218 may be implemented as a compressible elastomeric or metallic spring-type element. In embodiments, the elastomeric member 218 may be a natural polymer, a synthetic polymer, or a metallic spring that is resiliently deformable. The sheet of the second device 112 may be a single sheet of stainless steel, preferably not heat treated, such that the single sheet is deformable in a controlled manner. In a particular embodiment, the energy absorber is constructed from 304 stainless steel sheet having a width between about 1 inch and about 6 inches, more preferably between about 2 inches and about 4 inches, and even more preferably between about 2 inches and about 3 inches.

The second device 112 during normal use of the seat and below a second predetermined threshold load value, greater than the first predetermined threshold load value, maintains a fixed positional relationship between the carrier assembly 202 and the carriage assembly 204 such that the two assemblies translate up and down together as a single unit relative to the seat base, for example, during less severe dynamic events in which the first device 110 operates. In other words, during typical or regular use of the seat, the second, one-time use device 112 resists deformation while the first-repeated-use device 110 resiliently deforms and recovers.

During a severe dynamic event in which both the first and second predetermined threshold load values are ultimately exceeded, the first device 110 activates first to absorb a portion of the initial energy to a point at which the limit of the first device 110 is reached, after which the second device 112 activates to absorb continued energy and transfer the same to the seat frame. In other words, the two devices 110, 112 act in sequence during a severe dynamic event such that the first device 110 activates first to a compressive limit and thereafter transfers remaining energy to the second device 112.

Figure 6:
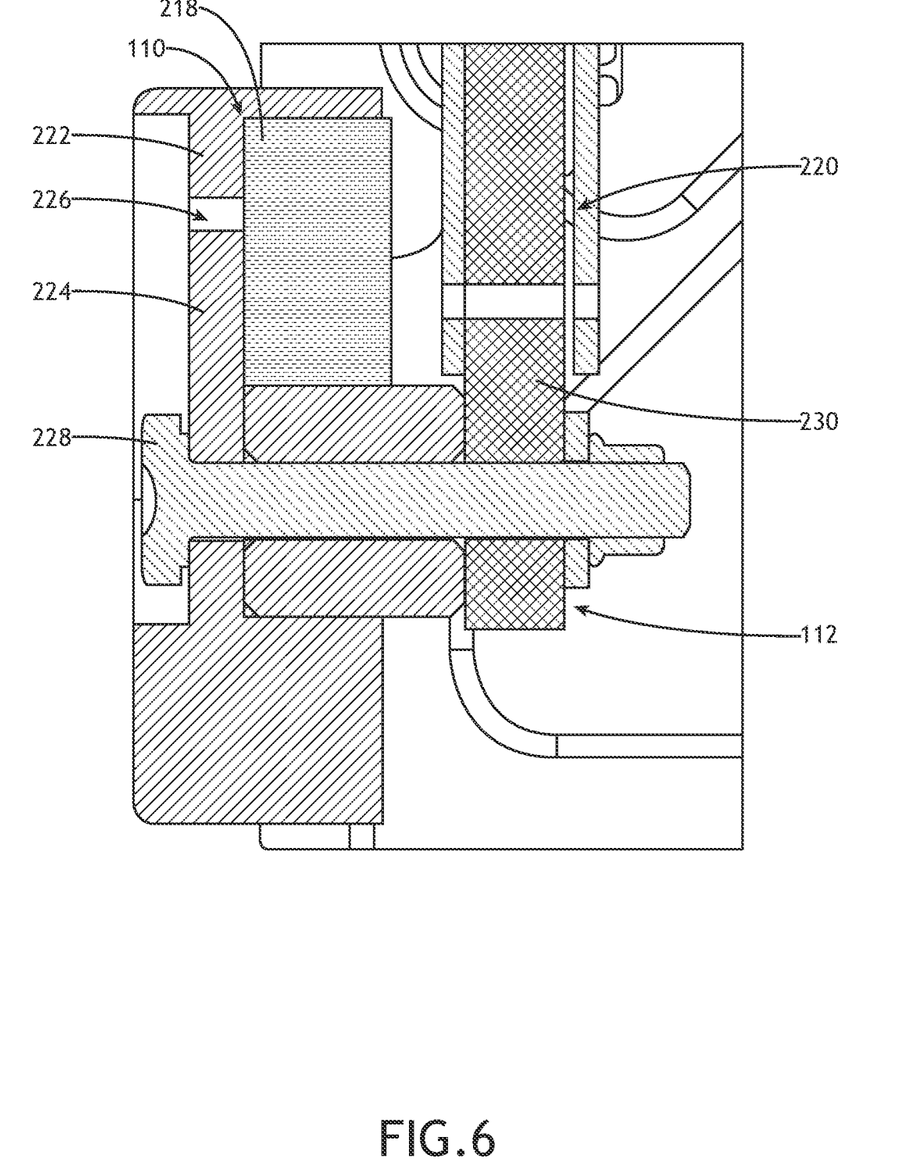
FIG. 6 shows a repeated-use energy absorbing device associated with a one-time use energy absorbing device implemented as a wire bender system, wherein the two devices activate sequentially.
Figure 7:
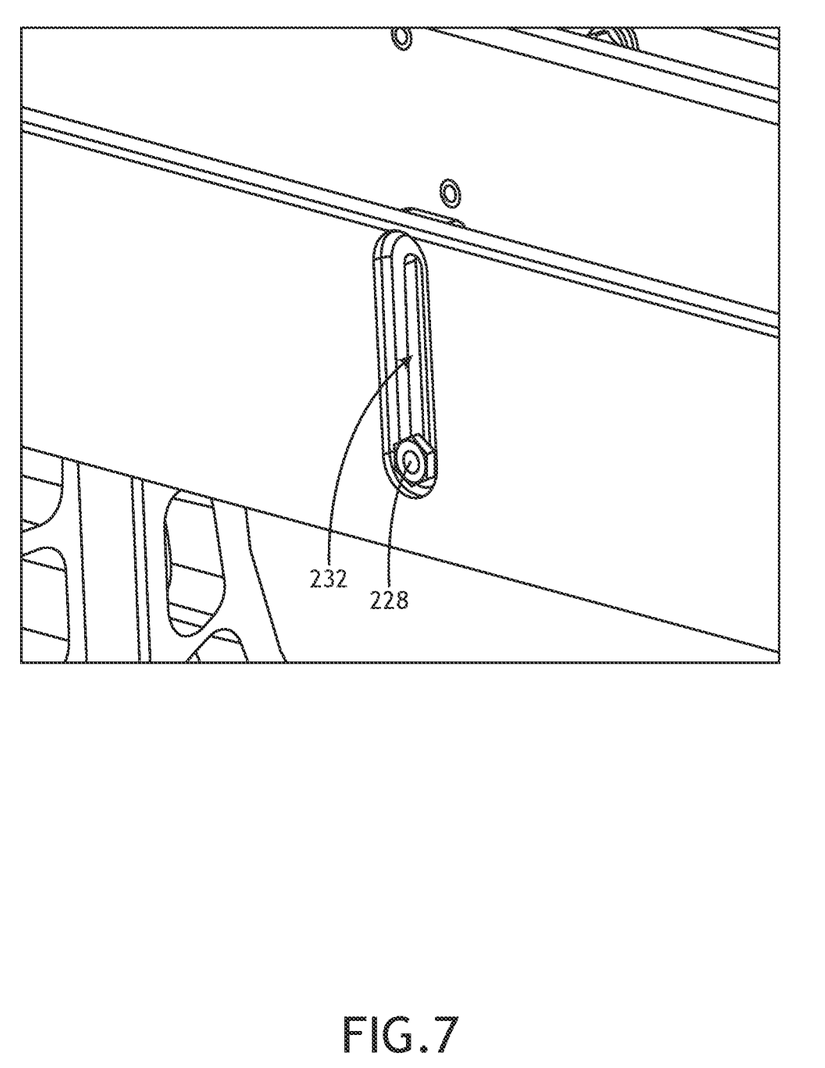
FIG. 7 shows a position of the repeated-use energy absorbing device in relation to a backside of the pilot seat.
Figure 8:
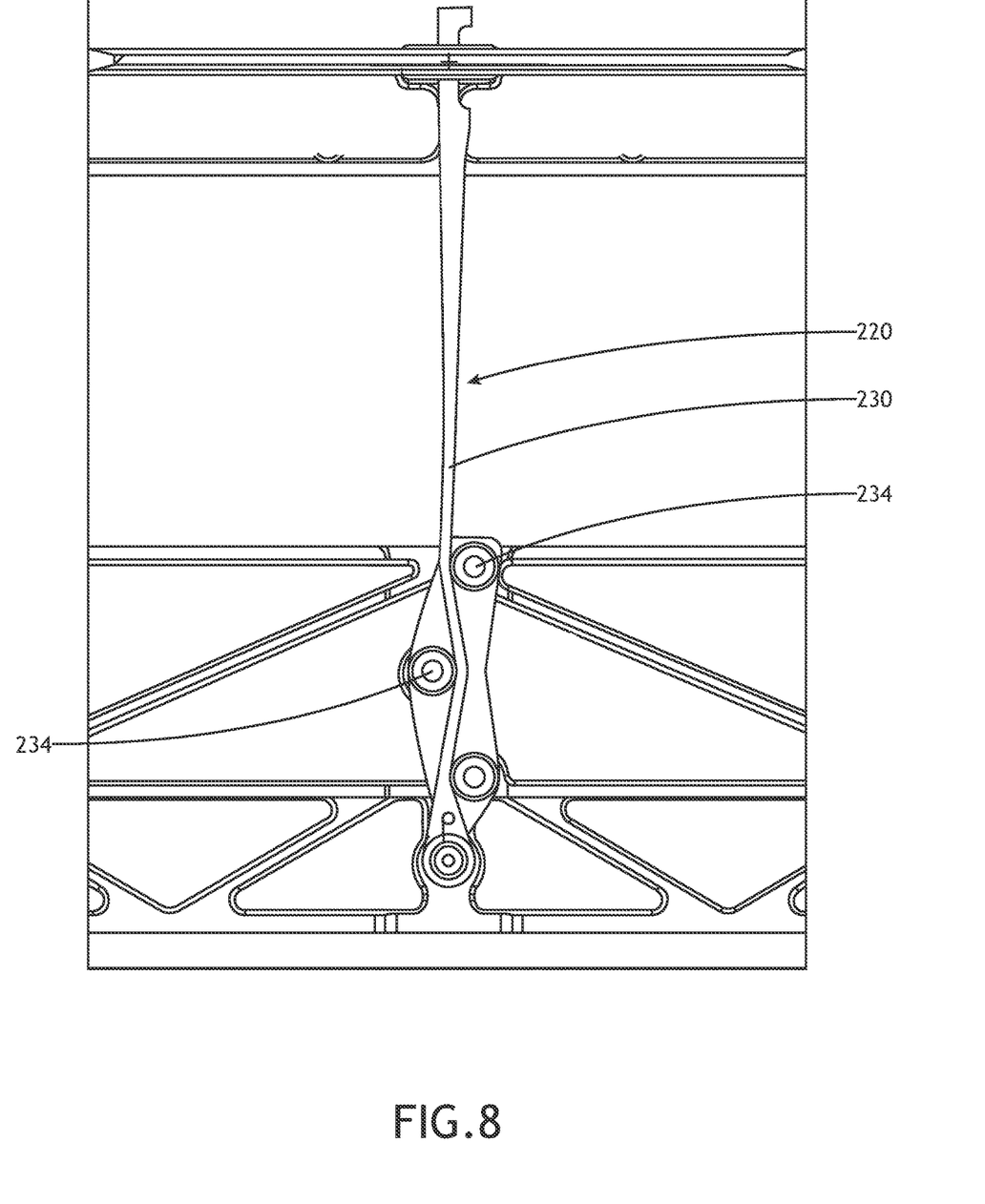
FIG. 8 shows a wire bender system implemented as the one-time use energy absorbing device.

FIGS. 6-8 show another embodiment of the two-stage energy absorbing system in which the first device 110 includes the elastomeric member 218 and the second device is implemented as a wide bender system 220. As shown in FIG. 6, the elastomeric member 218 is positioned between a first member 222 movable relative to a second member 224. In embodiments, the first and second members 222, 224 may be attached to the seat base, seat bucket, motion controller, etc. The elastomeric member 218 is constrained between the first and second members 222, 224 such that movement of the members toward each other causes the elastomeric member 218 to compress. A physical stop 226 is provided at an interface between the two members 222, 224 such that when a predetermined compressive limit of the elastomeric member 218 is reached the first second members 222, 224 come into direct physical contact at the location of the physical stop. Remaining energy not absorbed by the first device 110 is thereby transferred to the second device 112, at the member interface, implemented as the wire bender system 220.

The wire bender system 220 includes a bolt 228 coupled to one end of a wire 230. The opposing end of the wire 230 is coupled to the seat bucket or to the motion controller associated with the seat bucket. In use, when the predetermined second load value is exceeded, the wire 230 is caused to be pulled through a series of rollers that cause the wire to be bent and unbent, thereby absorbing energy and slowing downward stroking of the seat bucket as the resistance in the wire increases, such as from the increasing thickness of the wire. FIG. 7 shows a particular location of the energy absorbing system within the seat and accessible through the backside of the seat. As shown, the bolt 228 travels along an elongated vertical slot 232. When the bolt 228 bottoms within the slot the bolt forces the second frame downward causing the wire 230 to be pulled.

FIG. 8 shows a non-limiting example of the wire bender system 220 according to the present disclosure. The system 220 generally includes the wire 230 threaded through a series of rollers 234 that cause the wire to be bent and unbent as the wire is pulled through the rollers. FIG. 8 also shows the increasing thickness of the wire such that the resistance increases as the wire continues to be pulled through the rollers. The wire shape, number of rollers, degree of induced wire bending, etc. may be customized to control the downward stroking motion.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A seat, comprising:
   a seat base;
   a seat bucket movable relative to the seat base;
   a motion controller coupled between the seat bucket and the seat base configured to control a motion path of the seat bucket, the motion controller including a carrier assembly adjustably coupled to the seat base, and a carriage assembly coupled to the seat bucket and movably coupled to the carrier assembly;
   a first energy absorbing device associated with the motion controller and including an elastomeric element, the elastomeric element configured to control stroking motion of the motion controller relative to the seat base; and
   a second energy absorbing device associated with the motion controller and including a deformable element, the deformable element movably coupling the carriage assembly to the carrier assembly;
   wherein:
   when a first predetermined load value on the seat bucket is exceeded, the elastomeric element is configured to undergo resilient deformation to allow the motion controller to stroke relative to the seat base;
   when a second predetermined load value on the seat bucket is exceeded, greater than the first predetermined load value, the deformable element is configured to undergo plastic deformation to allow the carriage assembly to stroke relative to the carrier assembly to allow the seat bucket to continue stroking relative to the seat base; and
   the first and second energy absorbing devices are separate devices and are configured to activate sequentially such that the first energy absorbing device is configured to absorb first energy from a dynamic event and transfer remaining energy from the dynamic event to the second energy absorbing device.

2. The seat according to claim 1, wherein the seat base includes guideways and each of the carriage assembly and the carrier assembly include guides configured to travel along the guideways as the motion controller strokes relative to the seat base and/or the carriage assembly strokes relative to the carrier assembly.

3. The seat according to claim 1, wherein the first energy absorbing device comprises:
   a guide member defining an elongated guideway, wherein the elastomeric element is positioned in the guideway; and
   a guide positioned in the elongated guideway in contact with the elastomeric element;
   wherein, in use, when the first predetermined load value is exceeded, the guide travels along the elongated guideway thereby compressing the elastomeric element.

4. The seat according to claim 3, wherein the elastomeric element is a natural polymer, a synthetic polymer, a metallic spring, or combinations thereof.

5. The seat according to claim 1, wherein the deformable element is a singular sheet having an introduced fold, and wherein the sheet is 304 stainless steel sheet and is not heat treated.

6. The seat according to claim 1, wherein the deformable element is a wire associated with a wire bender system including a plurality of rollers, wherein the wire is threaded through the plurality of rollers such that the wire is configured to be bent and unbent as the wire is pulled through the plurality of rollers.

7. The seat according to claim 1, wherein the first energy absorbing device is accessible through an opening formed in a back of the seat and the second energy absorbing device is positioned within the seat.

8. An energy absorbing system, comprising:
   a first energy absorbing device including an elastomeric element, the first energy absorbing device configured to control stroking motion of a seat motion controller; and
   a second energy absorbing device including a deformable element, the second energy absorbing configured to control relative motion within the seat motion controller;
   wherein:
   when a first predetermined load value on the seat motion controller is exceeded, the elastomeric element is configured to undergo resilient deformation to allow the seat move motion controller to stroke without relative within the seat motion controller; and
   when a second predetermined load value on the seat motion controller is exceeded, greater than the first predetermined load value, the deformable element is configured to undergo plastic deformation to allow relative motion within the seat motion controller; and
   the first and second energy absorbing devices are separate devices and are configured to activate sequentially such that the first energy absorbing device is configured to absorb first energy from a dynamic event and transfer remaining energy from the dynamic event to the second energy absorbing device.

9. The energy absorbing system according to claim 8, wherein the seat motion controller is configured to movably couple a seat bucket to a seat base.

10. The energy absorbing system according to claim 9, wherein the seat motion controller comprises:
    a carrier assembly; and
    a carriage assembly;
    wherein the second energy absorbing device is coupled between the carriage assembly and the carrier assembly and is configured to prevent relative motion between the carriage assembly and the carrier assembly when the first predetermined load value is exceeded and permit relative motion between the carriage assembly and the carrier assembly when the second predetermined load value is exceeded.

11. The energy absorbing system according to claim 8, wherein the elastomeric element is a natural polymer, a synthetic polymer, a metallic spring, or combinations thereof.

12. The energy absorbing system according to claim 8, wherein the deformable element is a stainless steel sheet having an introduced fold.

13. The energy absorbing system according to claim 8, wherein the deformable element is a wire threaded through a plurality of wires of a wire bender system.

\* \* \* \* \*